(12) United States Patent
Hernandez et al.

(10) Patent No.: US 7,768,760 B2
(45) Date of Patent: Aug. 3, 2010

(54) POWER DISTRIBUTION BUS WITH PROTECTION AND ALARMING

(75) Inventors: Delfino Hernandez, Juarez (MX); David J. Johnsen, New Hope, MN (US); Luis Armando Yanes, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 24 days.

(21) Appl. No.: 12/344,658

(22) Filed: Dec. 29, 2008

(65) Prior Publication Data

US 2009/0213516 A1 Aug. 27, 2009

Related U.S. Application Data

(62) Division of application No. 11/507,948, filed on Aug. 21, 2006, now Pat. No. 7,480,127, which is a division of application No. 10/914,721, filed on Aug. 9, 2004, now Pat. No. 7,120,002, which is a division of application No. 09/911,360, filed on Jul. 23, 2001, now Pat. No. 6,775,120.

(51) Int. Cl.
*H02H 5/00* (2006.01)
(52) U.S. Cl. .......................... 361/103; 361/104; 361/115
(58) Field of Classification Search ................ 361/103, 361/104, 41, 124, 115, 125; 200/61.03, 61.04
See application file for complete search history.

(56) References Cited

U.S. PATENT DOCUMENTS

| | | | |
|---|---|---|---|
| 5,136,456 A | 8/1992 | Yeh | |
| 5,428,347 A | 6/1995 | Barron | |
| 5,986,558 A | 11/1999 | Crawford et al. | |
| 6,775,120 B2 | 8/2004 | Hernandez et al. | |
| 7,120,002 B2 | 10/2006 | Hernandez et al. | |
| 7,209,048 B1* | 4/2007 | Pace et al. | 340/687 |
| 7,480,127 B2* | 1/2009 | Hernandez et al. | 361/103 |

FOREIGN PATENT DOCUMENTS

GB 2 034 136 A 5/1980

OTHER PUBLICATIONS

Telpower DC Power Protection Systems; Telpower Compact Fused Disconnect Switch TPC & TPCDS; Cooper Bussmann; Sep. 24, 2000.
Telect; High Current Power Distribution Alarm Panel Users Manual; pp. 1-45; getinfo@telect.com.
Remote Operated Circuit Breakers; Carling Technologies; www.carlingtech.com; May 18, 2001.
Custom Power Distribution; Carlingswitch; www.carlingswitch.com; May 1999.

* cited by examiner

*Primary Examiner*—Jessica Han
(74) *Attorney, Agent, or Firm*—Merchant & Gould P.C.

(57) ABSTRACT

Power distribution busses and methods are disclosed that provide flexible protection and alarming capabilities. Various embodiments provide interchangeability of fuses and circuit breakers within the same power distribution bus configuration. These various embodiments also provide discrete alarming for fused lines, discrete alarming for lines with circuit breakers, combined alarming for lines having mixed forms of protection, and/or selectable alarming such as combined versus discrete in relation to employing all fused lines, employing all circuit breaker protected lines, or employing mixed line protection.

21 Claims, 7 Drawing Sheets

POWER DISTRIBUTION BUS WITH PROTECTION AND ALARMING

CROSS REFERENCE TO RELATED APPLICATIONS

This application is a divisional of application Ser. No. 11/507,948, filed Aug. 21, 2006, now U.S. Pat. No. 7,480,127 which is a divisional of application Ser. No. 10/914,721, filed Aug. 9, 2004, now U.S. Pat. No. 7,120,002, which is a divisional of application Ser. No. 09/911,360, filed Jul. 23, 2001, now U.S. Pat. No. 6,775,120, which applications are incorporated herein by reference.

TECHNICAL FIELD

The present invention relates to power distribution units and providing power from a bus within the power distribution unit. More particularly, the present invention relates to providing protection and alarming for the bus within the power distribution unit.

BACKGROUND

Power distribution units generally provide current to downstream devices operating at a given voltage. A bus is included in the power distribution unit and acts as a voltage node that provides the current to the devices. The current that is provided to each individual device generally falls within an acceptable range. However, one or more downstream devices may draw more current than normal due to a heavier than normal load or due to a device malfunction. For purposes of protecting both the power distribution unit and the downstream device, it is desirable to block current from the power distribution unit to the downstream device when the current drawn by the device exceeds a threshold amount.

Limiting the current to the downstream device is often done by including a fuse in each line leading to each device from the bus. The fuse often provides an alarm voltage so that when the fuse blows due to excessive current, the alarm is triggered. However, the conventional use of fuses in power distribution busses has drawbacks when multiple lines of power are being provided by the power distribution unit because the alarm circuit of conventional power distribution units indicates that a fuse is blown but does not indicate which line is blocked due to a blown fuse. Furthermore, conventional power distribution units that are configured to operate with fuses are not configured to operate with circuit breakers on some or all lines.

Circuit breakers are used by some conventional power distribution units to limit the current in each line. However, conventional power distribution units using circuit breakers suffer from the same drawbacks as those using fuses. A general alarm is generated by the alarm circuit of a conventional power distribution in response to a tripped breaker, but no indication of the particular line that is blocked is provided. Furthermore, conventional power distribution units that are configured to operate with a circuit breaker are not configured to also operate with a fuse on some or all lines.

It may be useful in some instances to have fuses on some of the lines output by the power distribution bus while having circuit breakers on other lines. Circuit breakers often have an alarming capability that functions by receiving voltage from a voltage source, such as from the alarm circuit itself. Fuses often have an alarming capability that functions by channeling voltage from the power distribution line to the alarm circuitry. Therefore, conventional power distribution units have not permitted interchanging fuses with circuit breakers.

Thus, there is a need in the art for more flexible protection and alarming capabilities for power distribution buses.

SUMMARY

The embodiments of the present invention address the problems discussed above and others by providing a power distribution bus with flexible protection and alarming features. Various embodiments permit fuses to be mixed with circuit breakers, permit discrete alarming for each line from the bus, permit combined alarming for the lines of the bus, and/or permit selectable discrete or combined alarming.

The present invention may be viewed as a method of employing fuses and circuit breakers with a power distribution bus. The method involves inserting a fuse with an alarm connector in a first location plugged into the bus for receiving power from the power distribution bus and inserting a circuit breaker with a pair of alarm connectors in a second location plugged into the bus for receiving power from the power distribution unit. The method also involves inhibiting a response from an alarm circuit electrically linked to the first location and second location until the fuse is blown or until the circuit breaker is tripped.

The present invention may be viewed as a power distribution bus alarm circuit. The power distribution bus includes a first and a second socket, each having three alarm connections and two power connections. The bus also includes an alarm circuit connected to first and second alarm connections of the first and second sockets, with the alarm circuit being responsive to a voltage being applied from the first of the three connections of the first or second socket and being responsive to a voltage being applied across second and third connections of the first or second sockets. The bus additionally includes a voltage source electrically connected to third alarm connections of the first and second sockets. The bus also includes a fuse positioned in the first socket, with the fuse electrically interconnecting the two power connections and isolating the first alarm connection from the power connection when in a non-blown state. Additionally, the bus includes a circuit breaker positioned in the second socket, with the circuit breaker electrically interconnecting the two power connections when in a non-tripped state and electrically interconnecting the second and third alarm connections when in a tripped state.

The present invention may be viewed as another method of employing fuses and circuit breakers with a power distribution bus. The method involves inserting a fuse with an alarm connector in a first location in the bus for receiving power from the power distribution unit and inserting a circuit breaker with a pair of alarm connectors in a second location in the bus for receiving power from the power distribution unit. The method additionally involves inhibiting a response from a first alarm circuit electrically linked to the first location until the fuse is blown and inhibiting a response from a second alarm circuit electrically linked to the second location until the circuit breaker is tripped.

The present invention may be viewed as another power distribution bus alarm circuit. The bus includes a first and a second socket, with each having three alarm connections and two power connections. The bus includes a first alarm circuit connected to first and second alarm connections of the first socket, with the alarm circuit being responsive to a voltage being applied from the first of the three connections of the first socket and being responsive to a voltage being applied across second and third connections of the first socket. The bus also includes a second alarm circuit connected to first and second alarm connections of the second socket, with the alarm circuit being responsive to a voltage being applied from the first of the three connections of the second socket and being responsive to a voltage being applied across second and third connections of the second socket. The bus additionally includes a voltage source electrically connected to third alarm connections of the first and second sockets. Also, the bus includes a fuse positioned in the first socket, with the fuse electrically interconnecting the two power connections and isolating the first alarm connection from the power connection when in a non-blown state. Additionally, the bus includes a circuit breaker positioned in the second socket, with the circuit breaker electrically interconnecting the two power connections when in a non-tripped state and electrically interconnecting the second and third alarm connections when in a tripped state.

The present invention may be viewed as another method of employing fuses and circuit breakers with a power distribution bus. The method involves inserting a fuse with an alarm connector in a first location in the bus for receiving power from the power distribution unit and inserting a circuit breaker with a pair of alarm connectors in a second location in the bus for receiving power from the power distribution unit. The method also involves electrically connecting the first location to a first alarm circuit or a second alarm circuit and electrically connecting the second location to the first alarm circuit or to a third alarm circuit. Additionally, the method involves inhibiting a response from the first alarm circuit or second alarm circuit electrically linked to the first location until the fuse is blown and inhibiting a response from the first alarm circuit or third alarm circuit electrically linked to the second location until the circuit breaker is tripped.

The present invention may be viewed as another power distribution bus alarm circuit. The power distribution bus includes a first and a second socket, with each having three alarm connections and two power connections. The bus also includes a voltage source electrically connected to third alarm connections of the first and second sockets. Additionally, the bus includes a fuse positioned in the first socket, with the fuse electrically interconnecting the two power connections and isolating the first alarm connection from the power connection when in a non-blown state. The bus also includes a circuit breaker positioned in the second socket, with the circuit breaker electrically interconnecting the two power connections when in a non-tripped state and electrically interconnecting the second and third alarm connections when in a tripped state. The bus additionally includes a first conductive path extending from the first alarm connection of the first socket, with the first conductive path including a first diode that prevents current flow between the first alarm connection of the first socket and the first alarm connection of the second socket. The bus also includes a second conductive path extending from the first alarm connection of the second socket, with the second conductive path including a diode that prevents current flow between the first alarm connection of the second socket and the first alarm connection of the first socket. The bus further includes a third conductive path extending from the second alarm connection of the first socket, with the third conductive path including a diode that prevents current flow between the second alarm connection of the first socket and the second alarm connection of the second socket. The bus also includes a fourth conductive path extending from the second alarm connection of the second socket, with the fourth conductive path including a diode that prevents current flow between the second alarm connection of the second socket and the second alarm connection of the first socket.

The present invention may also be viewed as a method of employing fuses with a power distribution bus. The method involves inserting a first fuse with an alarm connector in a first location in the bus for receiving power from the power distribution unit and inserting a second fuse with an alarm connector in a second location in the bus for receiving power from the power distribution unit. The method also involves inhibiting a response from a first alarm circuit electrically linked to the first location until the first fuse is blown and inhibiting a response from a second alarm circuit electrically linked to the second location until the second fuse is blown.

The present invention may be viewed as a power distribution bus alarm circuit. The power distribution bus includes a first and a second socket, each having an alarm connection and two power connections. The bus also includes a first alarm circuit connected to the alarm connection of the first socket, with the first alarm circuit being responsive to a voltage being applied from the alarm connection of the first socket. The bus additionally includes a second alarm circuit connected to the alarm connection of the second socket, with the second alarm circuit being responsive to a voltage being applied from the alarm connection of the second socket. Also, the bus includes a first fuse positioned in the first socket, with the first fuse electrically interconnecting the two power connections and isolating the alarm connection of the first socket from the power connection when in a non-blown state. The bus also includes a second fuse positioned in the second socket, with the second fuse electrically interconnecting the two power connections isolating the alarm connection of the second socket when in a non-blown state.

The present invention may be viewed as a method of employing circuit breakers with a power distribution bus. The method involves inserting a first circuit breaker with a pair of alarm connectors in a first location in the bus for receiving power from the power distribution unit and inserting a second circuit breaker with a pair of alarm connectors in a second location in the bus for receiving power from the power distribution unit. The method further involves inhibiting a response from a first alarm circuit electrically linked to the first location until the first circuit breaker is tripped and inhibiting a response from a second alarm circuit electrically linked to the second location until the second circuit breaker is tripped.

The present invention may be viewed as another power distribution bus alarm circuit. The bus includes a first and a second socket, each having two alarm connections and two power connections. The bus also includes a first alarm circuit connected to first and second alarm connections of the first socket, with the alarm circuit being responsive to a voltage being applied across the two connections of the first socket. The bus additionally includes a second alarm circuit connected to first and second alarm connections of the second socket, with the alarm circuit being responsive to a voltage being applied across the two connections of the second socket. The bus also includes a voltage source electrically connected to one of the two connections of the first and second sockets. The bus includes a first circuit breaker positioned in the first socket, with the first circuit breaker electrically interconnecting the two power connections when in a non-tripped state and electrically interconnecting the two alarm connections when in a non-blown state. The bus also includes a second circuit breaker positioned in the second socket, with the second circuit breaker electrically interconnecting the two power connections when in a non-tripped state and electrically interconnecting the two alarm connections when in a tripped state.

The present invention may be viewed as another method of employing fuses with a power distribution bus. The method involves inserting a first fuse with an alarm connector in a first location in the bus for receiving power from the power distribution unit and inserting a second fuse with an alarm connector in a second location in the bus for receiving power from the power distribution unit. The method further involves electrically connecting the first location to a first alarm circuit or a second alarm circuit and electrically connecting the second location to the first alarm circuit or to a third alarm circuit. Additionally, the method involves inhibiting a response from the first alarm circuit or second alarm circuit electrically linked to the first location until the first fuse is blown and inhibiting a response from the first alarm circuit or third alarm circuit electrically linked to the second location until the second fuse is blown.

The present invention may be viewed as another power distribution bus alarm circuit. The bus includes a first and a second socket, with each having an alarm connection and two power connections. The bus also includes a first fuse positioned in the first socket, with the first fuse electrically interconnecting the two power connections and isolating the alarm connection of the first socket from the power connection when in a non-blown state. The bus includes a second fuse positioned in the second socket, with the second fuse electrically interconnecting the two power connections and isolating the alarm connection of the second socket from the power connection when in a non-blown state. The bus includes a first conductive path extending from the alarm connection of the first socket and a second conductive path extending from the alarm connection of the second socket. The bus also includes a third conductive path extending from the alarm connection of the first socket and a fourth conductive path extending from the alarm connection of the second socket.

The present invention may be viewed as another method of employing circuit breakers with a power distribution bus. The method involves inserting a first circuit breaker with a pair of alarm connectors in a first location in the bus for receiving power from the power distribution unit and inserting a second circuit breaker with a pair of alarm connectors in a second location in the bus for receiving power from the power distribution unit. The method also involves electrically connecting the first location to a first alarm circuit or a second alarm circuit and electrically connecting the second location to the first alarm circuit or to a third alarm circuit. The method additionally involves inhibiting a response from the first alarm circuit or second alarm circuit electrically linked to the first location until the first circuit breaker is tripped. Also, the method involves inhibiting a response from the first alarm circuit or third alarm circuit electrically linked to the second location until the second circuit breaker is tripped.

The present invention may be viewed as another power distribution bus alarm circuit. The bus includes a first and a second socket, with each having two alarm connections and two power connections. The bus also includes a voltage source electrically connected to one of the alarm connections of the first and second sockets. The bus includes a first circuit breaker positioned in the first socket, with the first circuit breaker electrically interconnecting the two power connections when in a non-tripped state and electrically interconnecting the two alarm connections when in a tripped state. The bus also includes a second circuit breaker positioned in the second socket, with the second circuit breaker electrically interconnecting the two power connections when in a non-tripped state and electrically interconnecting the alarm connections when in a tripped state. The bus additionally includes a first conductive path extending from the alarm connection of the first socket not connected to the voltage source and a second conductive path extending from the alarm connection of the second socket not connected to the voltage source.

DETAILED DESCRIPTION

Figure 1:
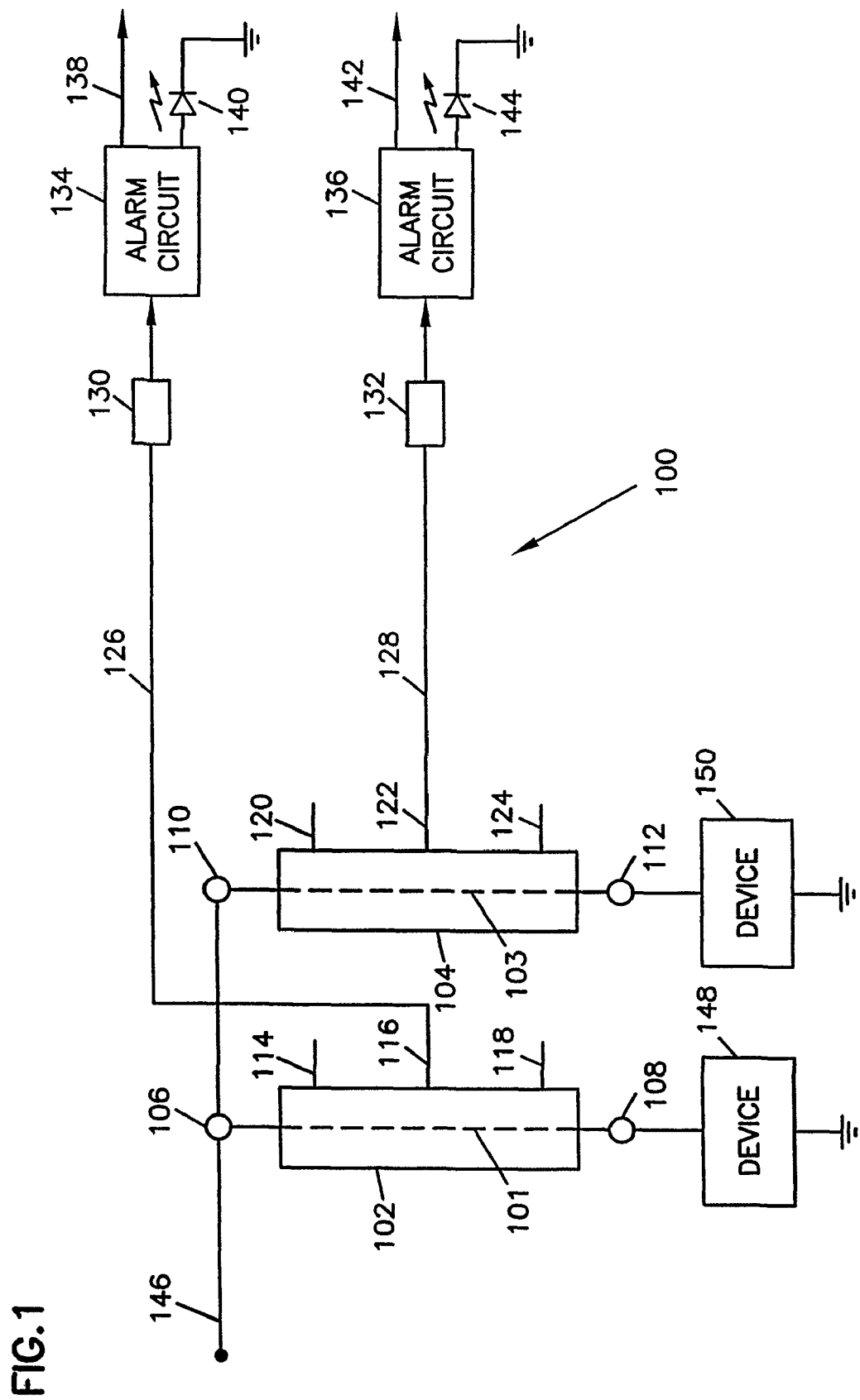
FIG. 1 is a schematic of a protection and alarming configuration employing discrete alarming with fuses.

FIG. 1 shows a protection and alarm configuration 100 for a power distribution bus 146. This configuration permits fuses to be used for protection while permitting discrete alarming for each distribution line. Several manufacturers make suitable fuses, such as the Cooper Bussman TPCDS-BUL disconnect in conjunction with the Cooper Bussman TPC series fuse. Although two individual distribution lines are shown in each of the drawings, it is to be understood that only two are shown to simplify understanding of the protection and alarm configurations and that any number of distribution lines may be applicable to the various protection and alarming configurations.

A voltage is provided on the power distribution bus 146 to a terminal 106 of a first socket 102 and to a terminal 110 of a second socket 104. The first socket has a fuse 101 that passes current from the bus 146 to a second terminal 108 that is connected to the downstream device 148. Likewise, the second socket has a fuse 103 that passes current from the bus 146 to a second terminal 112 that is connected to the downstream device 150. The terminals 106, 108, 110, and 112 may be of various types such as permanent connections or temporary connections where the alarm configuration circuitry 100 is contained in a plug-in module. The fuses 101, 103 protect the power distribution unit and downstream devices 148, 150 by breaking the current pathway when the current is excessive to either of the devices 148, 150.

The first socket 102 may have three alarm connections 114, 116, and 118, and the second socket 104 may have three alarm connections 120, 122, 124. However, in this embodiment only one alarm connection 116, 122 of the each socket 102, 104 is used. The alarm connection 116 connects to an alarm circuit interface 130 through a conductor 126 forming a conductive path from the first socket 102. The interface 130 may be any suitable connection, permanent or temporary, that establishes continuity between the socket 102 and an alarm circuit 134. An alarm circuit 134, as is known in the art, may generate a remote alarm signal 138, such as by triggering an internal relay (not shown), and/or may light a light emitting diode (LED) 140 to provide a visual indication as to the condition of the fuse 101.

The alarm connection 122 connects to an alarm circuit interface 132 through a conductor 128 forming a conductive path from the second socket 104. The interface 132 may be of the same type as interface 130. The interface 132 provides continuity between the second socket 104 and a second alarm circuit 136. The second alarm circuit 136 may be of the same type as the alarm circuit 134 to generate a remote alarm signal 142 and/or light the LED 144.

The fuse 101 of the first socket 102 isolates the distribution bus 146 from the alarm connection 116 when the fuse 101 is not blown, but when the fuse 101 blows the distribution bus 146 is channeled to the alarm connection 116 through the fuse 101. Likewise, the fuse 103 of the second socket isolates the distribution bus 146 from the alarm connection 122 when the fuse 103 is not blown. The first alarm circuit 134 does not respond to fuse 103 blowing, and the second alarm circuit 136 does not respond to the fuse 101 blowing. Therefore, discrete alarming for each line feeding power to devices 148, 150 is provided to permit individual monitoring.

Figure 2:
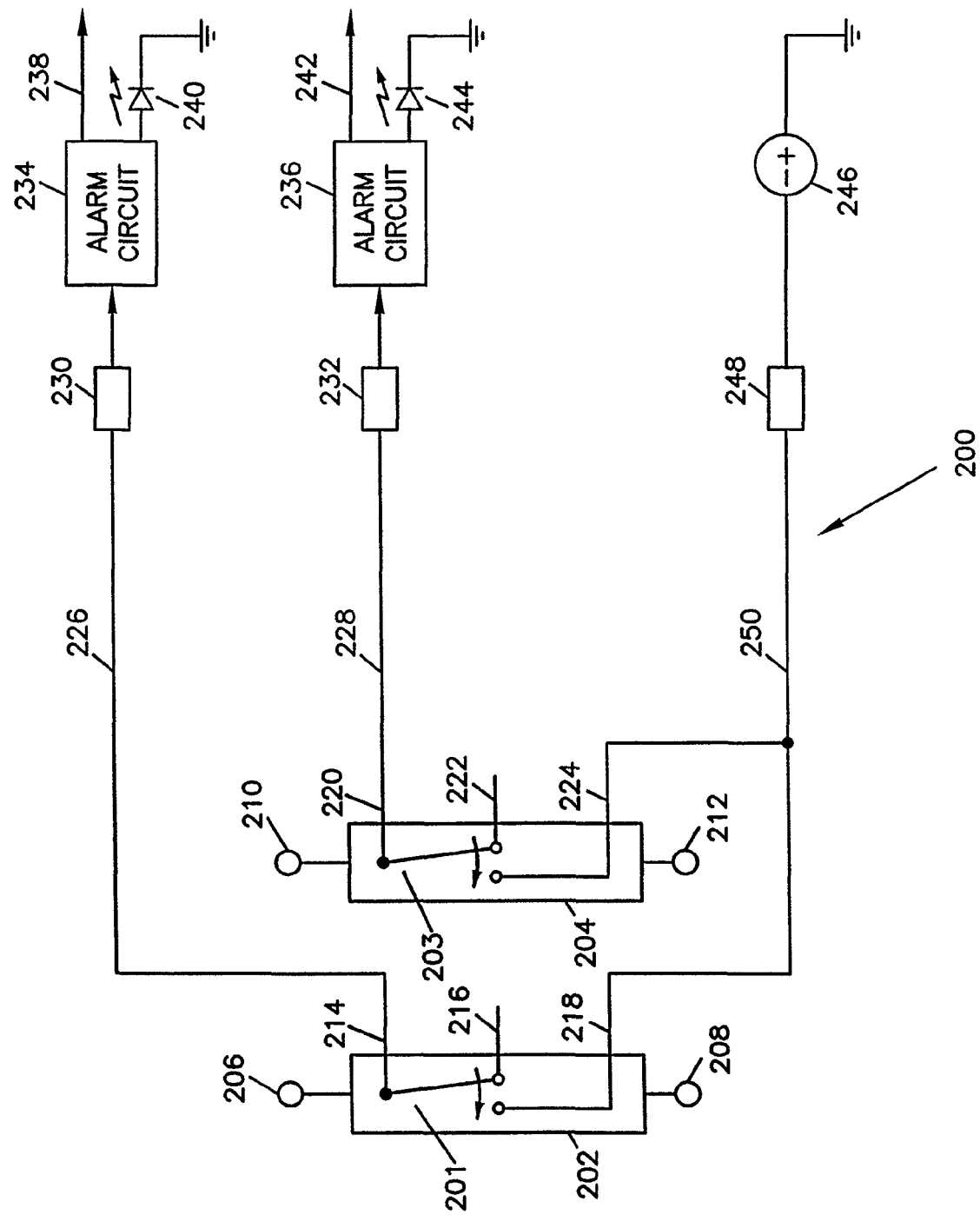
FIG. 2 is a schematic of a protection and alarming configuration employing discrete alarming with circuit breakers.

FIG. 2 shows a protection and alarm configuration 200 for a power distribution bus (not shown). This configuration permits circuit breakers to be used for protection while permitting discrete alarming for each distribution line. Examples of suitable circuit breakers include the Carling CA1-X0-07-819-AXX-C series, the Eaton AM 1R-B2-AC23D-A52, and the Airpax LMLK-1RLS4-31462-10-V. As previously discussed, two individual distribution lines are shown to simplify understanding of the protection and alarm configurations and any number of distribution lines may be applicable.

The alarm configuration 200 includes a first socket 202 having a terminal 206 that connects to a bus and a terminal 208 that leads to a downstream device. A circuit breaker 201 is inserted into the first socket 202. The circuit breaker 201 passes current from terminal 206 to terminal 208 until the current becomes excessive. Once the current is excessive, the circuit breaker 201 trips to stop current flow between the terminals 206, 208. The alarm configuration 200 also includes a second socket 204 having a terminal 210 that connects to a bus and a terminal 212 that leads to another downstream device. A circuit breaker 203 is inserted into the second socket 204. The circuit breaker 203 passes current from terminal 210 to terminal 212 until the current becomes excessive. Once the current is excessive, the circuit breaker 203 trips to stop current flow between the terminals 210, 212.

As discussed above with reference to FIG. 1, the sockets 202, 204 may include three alarm connections including connection 214, 216, and 218 for socket 202 and connections 220, 222, and 224 for socket 204. However, the configuration 200 only uses connections 214 and 218 for socket 202 and connections 220 and 224 for socket 204 to generate an alarm because connections 216 and 222, although connected to the circuit breakers 201, 203 when in a non-tripped state, are not connected to the alarm circuits 234, 236. The alarm connections 218, 224 are connected to a voltage source 246 through a conductor 250 and an interface 248. The voltage source shown provides negative voltage to the alarm circuits but one skilled in the art will recognize that positive voltage could be provided instead.

Tripping the circuit breaker 201 causes the alarm connection 218 to be connected to the alarm connection 214 and current flows between the voltage source 248 and the alarm circuit 234 through conductor 226 and interface 230. Likewise, tripping the circuit breaker 203 causes the alarm connection 224 to be connected to the alarm connection 220 and current flows between the voltage source 248 and the alarm circuit 236 through conductor 228 and interface 232. Thus, when circuit breaker 201 trips, alarm circuit 234 generates a remote alarm signal 238 and/or lights LED 240. When circuit breaker 203 trips, alarm circuit 236 generates a remote alarm signal 242 and/or lights LED 244. Circuit breaker 201 has no effect on alarm circuit 236 and circuit breaker 203 has no effect on alarm circuit 234. Therefore, discrete alarming is provided for each line to permit individual monitoring.

Figure 3:
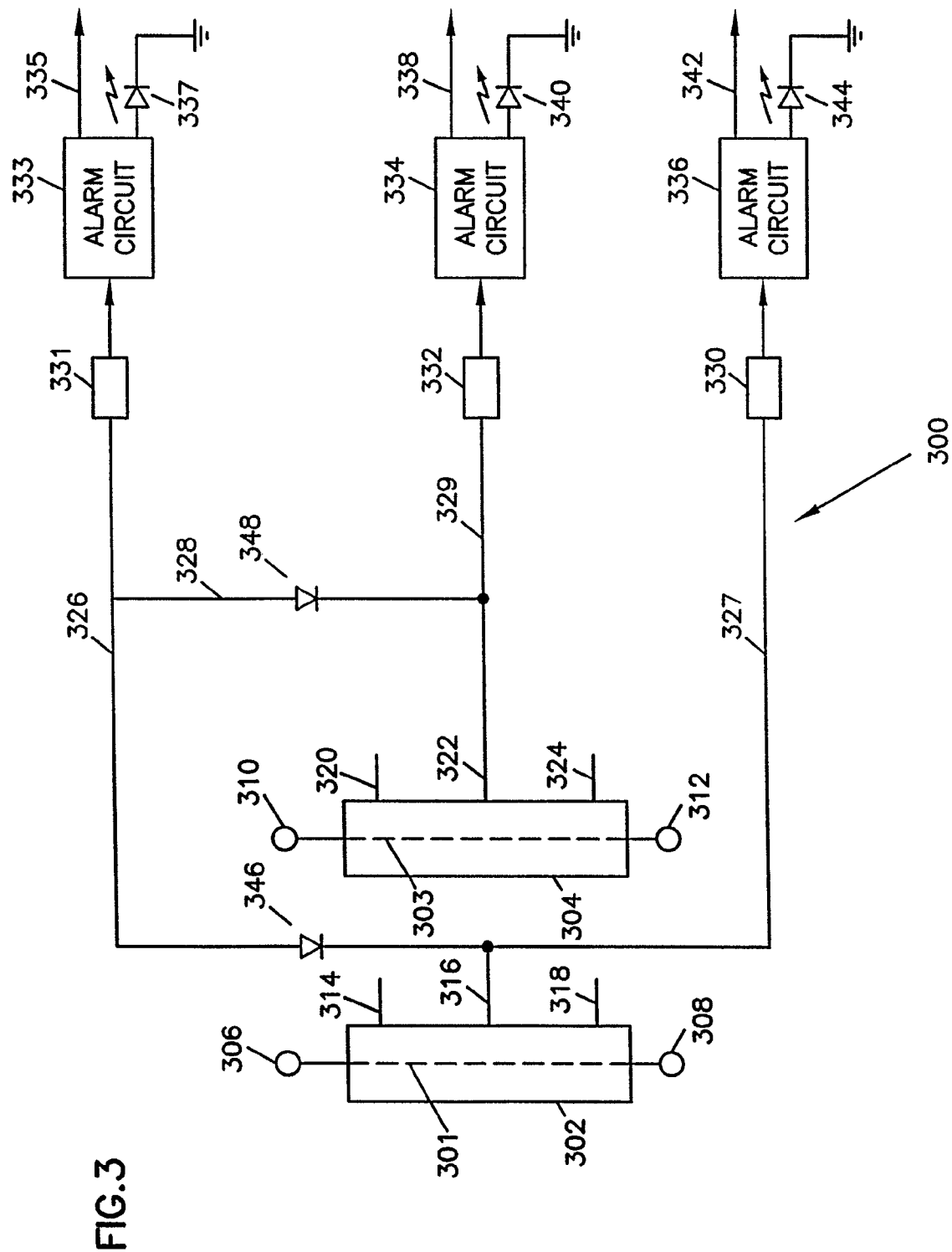
FIG. 3 is a schematic of a protection and alarming configuration employing selectable alarming with fuses.

FIG. 3 shows a protection and alarm configuration 300 for a power distribution bus (not shown). This configuration permits fuses to be used for protection while permitting selection of discrete alarming for each distribution line or a single alarm responsive to several of the distribution lines. As previously discussed, two individual distribution lines are shown to simplify understanding of the protection and alarm configurations and any number of distribution lines may be applicable.

The alarm configuration 300 includes a first socket 302 with a fuse 301 and a second socket 304 with a fuse 303. The fuse 301 carries current between terminal 306 and terminal 308, and fuse 303 carries current between terminal 310 and 312. Socket 302 may have three alarm connections 314, 316, and 318 and socket 304 may have three alarm connections 320, 322, and 324. However, only alarm connections 316 and 322 are used.

If a single alarm responsive to all lines is to be used, then alarm circuit 333 is connected to interface 331. When fuse 301 blows, current is channeled between the bus terminal 306 and alarm circuit 333 through alarm connection 316. Alarm connection 316 is connected to the interface 331 through a conductive path 326. Conductive path 326 may include a diode 346 which is discussed in more detail below with reference to discrete alarming for configuration 300. The bus voltage at terminal 306 is assumed to be negative for this diode direction. When alarm circuit 333 receives power from socket 302, a remote alarm signal 335 is generated and/or the LED 337 lights.

Additionally, if a single alarm responsive to all lines is to be used, then when fuse 303 blows, current is channeled between the bus terminal 310 and alarm circuit 333 through alarm connection 322. Alarm connection 322 is connected to the interface 331 through a conductive path 328. Conductive path 328 may include a diode 348 which is also discussed in more detail below with reference to discrete alarming for configuration 300. As mentioned, negative voltage is assumed at bus terminal 306 for this diode direction. When alarm circuit 333 receives power from socket 302, the remote alarm signal 335 is generated and/or LED 337 lights as is the case when fuse 301 blows.

If discrete alarming is desired, then alarm circuit 336 is connected to interface 330 and alarm circuit 334 is connected to interface 332 rather than alarm circuit 333 being connected to interface 331. If both single and discrete alarming are desired, alarm circuit 333 can be connected to interface 331 as well. If discrete alarming is implemented, then when fuse 301 blows, current flows between bus terminal 306 and alarm circuit 336. No current flows to alarm circuit 334 due to the fuse 301 being blown because diode 348 prevents current from flowing in that direction through conductive path 328. Alarm circuit 336 generates a remote alarm signal 342 and/or lights LED 344 in response to fuse 301 blowing.

Additionally, if discrete alarming is implemented, then when fuse 303 blows, current flows between bus terminal 310 and alarm circuit 334. No current flows to alarm circuit 336 because diode 346 prevents current from flowing in that direction through conductive path 326. Alarm circuit 334 generates a remote alarm signal 338 and/or lights LED 340 in response to fuse 303 blowing.

Figure 4:
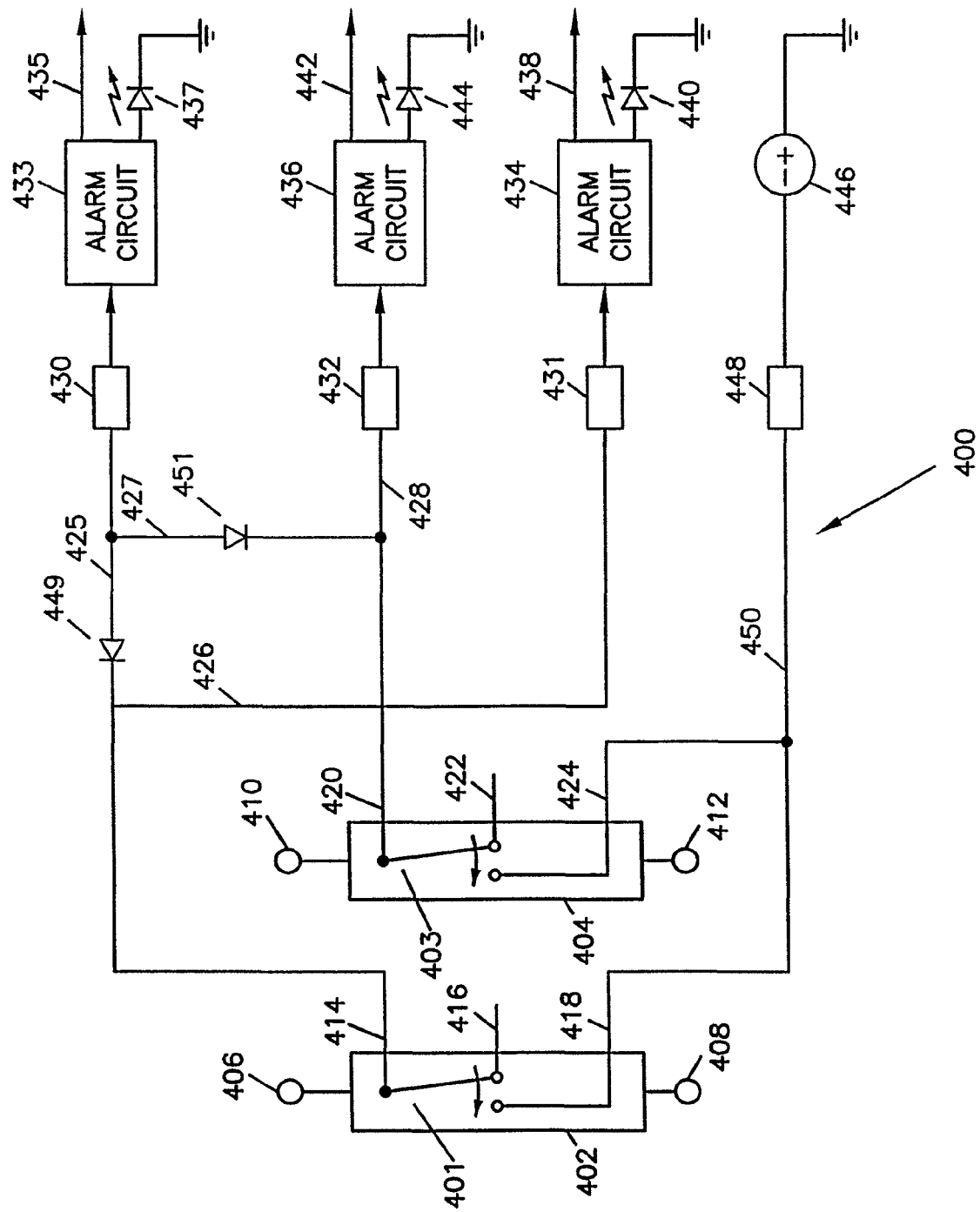
FIG. 4 is a schematic of a protection and alarming configuration employing selectable alarming with circuit breakers.

FIG. 4 shows a protection and alarm configuration 400 for a power distribution bus (not shown). This configuration permits circuit breakers to be used for protection while permitting selection of discrete alarming for each distribution line or a single alarm responsive to several of the distribution lines. As previously discussed, two individual distribution lines are shown to simplify understanding of the protection and alarm configurations and any number of distribution lines may be applicable.

The configuration 400 has a first socket 402 and second socket 404. A circuit breaker 401 located in the first socket 402 channels current between the bus terminal 406 and terminal 408 that leads to the downstream device. A circuit breaker 403 located in the second socket 404 channels current between the bus terminal 410 and the terminal 412 that leads to another downstream device. Both sockets may have three alarms connections such as connections 414, 416, and 418 of socket 402 and connections 420, 422, and 424 of socket 404. However, configuration 400 uses only connections 414, 418, 420, and 424 to provide current to the alarm circuits.

If a single alarm is to be used for several lines, then alarm circuit 433 is connected to interface 430. When circuit breaker 401 trips, alarm connection 414 is connected to alarm connection 418 and current is established between the voltage source 446 and the alarm circuit 433. The voltage source 446, which provides negative voltage as shown in FIG. 4 or alternatively positive voltage, passes current through conductive path 450 and socket 402 and also through conductive path 425 when providing power to alarm circuit 433. A diode 449 is included in path 425 and is discussed in more detail below with reference to configuration 400 being implemented with discrete alarming. The alarm circuit 433 generates a remote alarm signal 435 and/or lights LED 437 in response to fuse 401 blowing.

If the single alarm is in use, then when circuit breaker 403 trips, alarm connection 420 is connected to alarm connection 424 and current is established between the voltage source 446 and the alarm circuit 433. The voltage source 446 passes current through conductive path 450 and socket 404 and also through conductive path 427 when providing power to alarm circuit 433. A diode 451 is included in path 427 and is discussed in more detail below with reference to configuration 400 being implemented with discrete alarming. The alarm circuit 433 generates a remote alarm signal 435 and/or lights LED 437 in response to fuse 403 blowing.

If discrete alarming is to be used for each line, then alarm circuit 434 is connected to interface 431 and alarm circuit 436 is connected to interface 432 instead of alarm circuit 433 being connected to interface 430. If both discrete alarming and a single alarm are desired, then alarm circuit 433 may also be connected to interface 430. If discrete alarming is implemented, then when fuse 401 blows, current is established between the voltage source 446 and the alarm circuit 434. Current is provided by the voltage source 446 through conductive path 450 and conductive path 426. Diode 451 prevents power from being applied to alarm circuit 436 in response to fuse 401 blowing. Alarm circuit 434 generates a remote alarm signal 438 and/or lights LED 440 in response to fuse 401 blowing.

If discrete alarming is implemented, then when fuse 403 blows, current is established between the voltage source 446 and the alarm circuit 436. Current is provided by the voltage source 446 through conductive path 450 and conductive path 428. Diode 449 prevents power from being applied to alarm circuit 434 in response to fuse 403 blowing. Alarm circuit 436 generates a remote alarm signal 442 and/or lights LED 444 in response to fuse 403 blowing.

Figure 5:
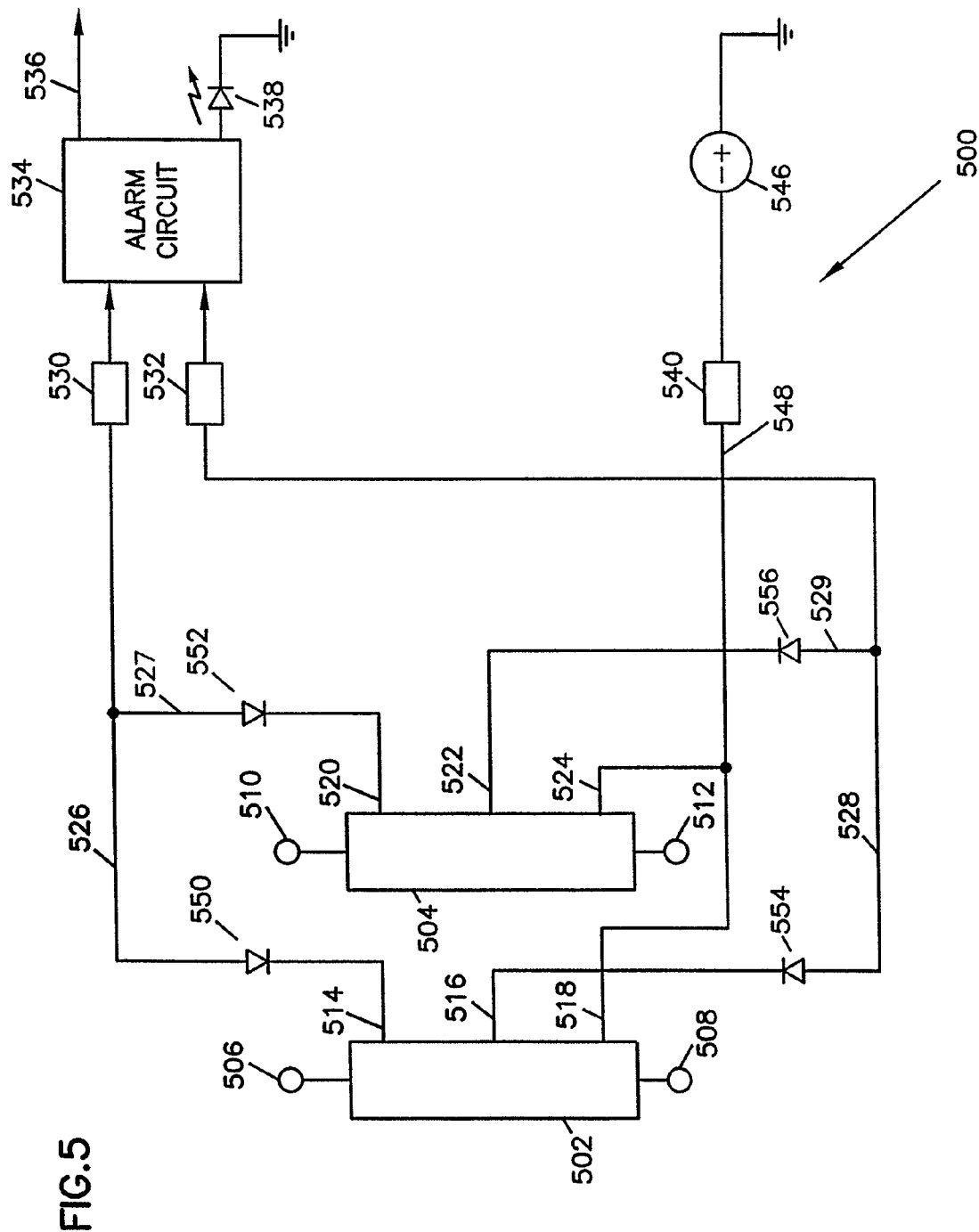
FIG. 5 is a schematic of a protection and alarming configuration employing combined alarming with mixed fuses and circuit breakers.

FIG. 5 shows a protection and alarm configuration 500 for a power distribution bus (not shown). This configuration permits fuses and circuit breakers to be mixed for protection while a single alarm is responsive to several of the distribution lines. At any given time, one socket may have a fuse and the other may have a circuit breaker, both may have fuses, or both may have circuit breakers. As previously discussed, two individual distribution lines are shown to simplify understanding of the protection and alarm configurations and any number of distribution lines may be applicable.

The configuration 500 includes a socket 502 and a socket 504. Current from the power distribution bus (not shown) is provided through a fuse or circuit breaker in socket 502 from the bus terminal 506 to the terminal 508 that leads to a downstream device. Current from the power distribution bus is also provided through a fuse or circuit breaker in socket 504 from the bus terminal 510 to the terminal 512.

When a circuit breaker is used in the first socket 502, once the circuit breaker trips, current is established between a voltage source 546 and an alarm circuit 534 through connections 514 and 518 of socket 502. Current passes through interface 540 connected to voltage source 546, through conductive paths 548 and 526, and through interface 530. Conductive path 526 may include a diode 550 that prevents a tripped circuit breaker in socket 504 from providing voltage from supply 546 to the fuse alarm interface 532 through the first socket 502 when the first socket 502 contains a non-tripped circuit breaker. Diode 550 is useful where the bus voltage normally supplied to interface 532 due to a blown fuse is a different voltage than the supply voltage 546. Alarm circuit 534 generates a remote alarm signal 536 and/or lights LED 538 in response to a tripped circuit breaker in socket 502.

When a circuit breaker is used in the second socket 504, once the circuit breaker trips, current is established between the voltage source 546 and the alarm circuit 534 through connections 520 and 524 of socket 504. Current passes through interface 540 connected to voltage source 546, through conductive paths 548 and 527, and through interface 530. Conductive path 527 may include a diode 552 that prevents a tripped circuit breaker in socket 502 from providing voltage from supply 546 to the fuse alarm interface 532 through the second socket 504 when the second socket contains a non-tripped circuit breaker. Alarm circuit 534 generates the remote alarm signal 536 and/or lights LED 538 in response to a tripped circuit breaker in the second socket 504.

When a fuse is used in the first socket 502, once the fuse has blown, current is established between the bus and the alarm circuit 534 through connection 516. Current passes through interface 532 and through conductive path 528. Conductive path 528 may include a diode 554 that prevents a blown fuse in socket 504 from providing voltage from the bus to the circuit breaker alarm interface 530 through conductive paths 528 and 526 when socket 502 has a non-tripped circuit breaker. Alarm circuit 534 generates a remote alarm signal 536 and/or lights LED 538 in response to a blown fuse in socket 502.

When a fuse is used in the second socket 504, once the fuse has blown, current is established between the bus and the alarm circuit 534 through connection 522. Current passes through interface 532 and through conductive path 529. Conductive path 529 may include a diode 556 that prevents a blown fuse in socket 502 from providing voltage from the bus to the circuit breaker alarm interface 530 through conductive paths 529 and 527 when socket 504 has a non-tripped circuit breaker. Alarm circuit 534 generates the remote alarm signal 536 and/or lights LED 538 in response to a blown fuse in socket 504.

Figure 6:
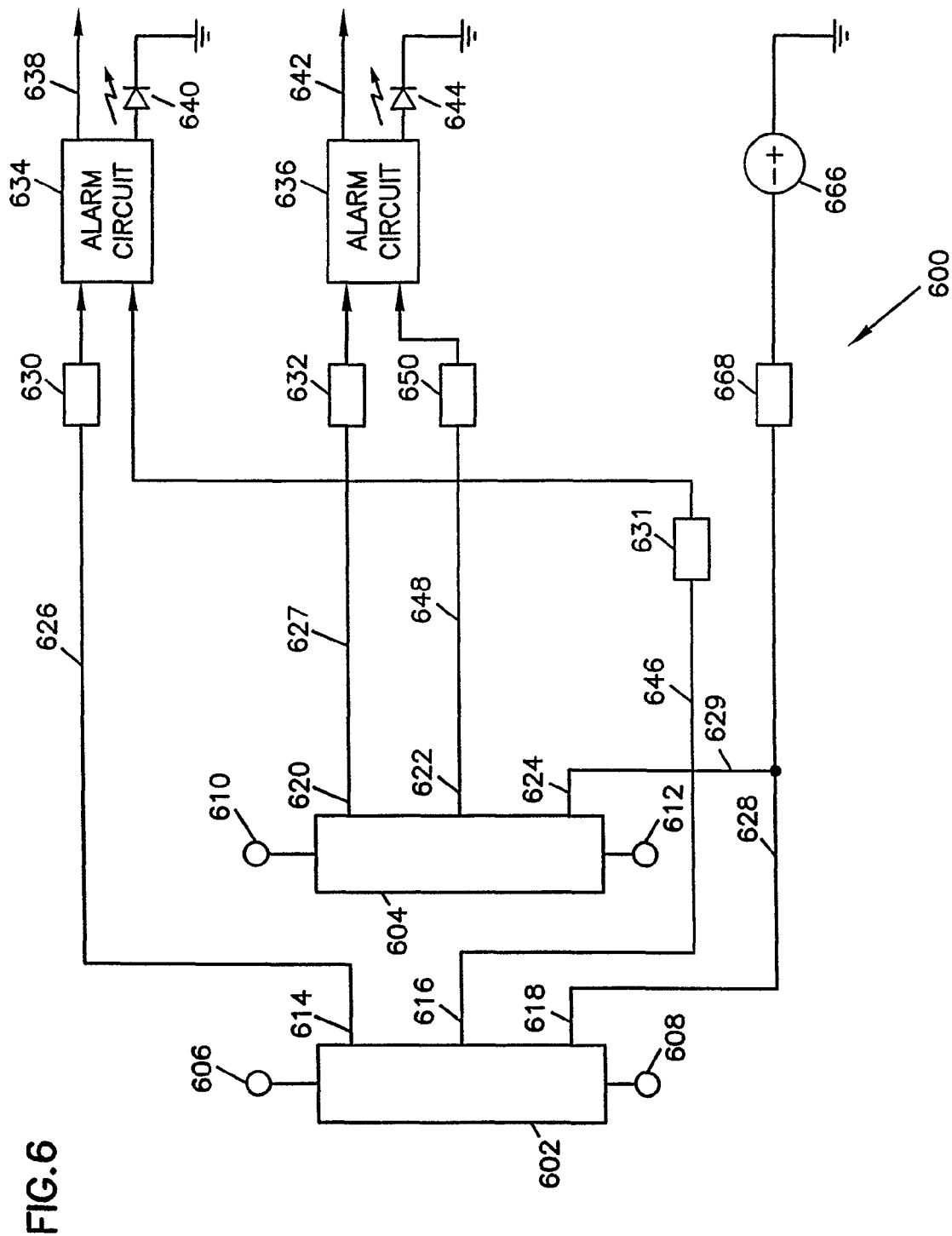
FIG. 6 is a schematic of a protection and alarming configuration employing discrete alarming with mixed fuses and circuit breakers.

FIG. 6 shows a protection and alarm configuration 600 for a power distribution bus (not shown). This configuration permits fuses and circuit breakers to be mixed for protection while discrete alarming is provided for each distribution line. At any given time, one socket may have a fuse and the other may have a circuit breaker, both may have fuses, or both may have circuit breakers. As previously discussed, two individual distribution lines are shown to simplify understanding of the protection and alarm configurations and any number of distribution lines may be applicable.

The configuration 600 includes a socket 602 and a socket 604. Current from the power distribution bus (not shown) is provided through a fuse or circuit breaker in socket 602 from the bus terminal 606 to the terminal 608 that leads to a downstream device. Current from the power distribution bus is also provided through a fuse or circuit breaker in socket 604 from the bus terminal 610 to the terminal 612.

When a fuse is used in the first socket 602, once the fuse has blown, current is established between the bus and alarm circuit 634. Current flows through alarm connection 616, through conductive path 646, and through interface 631. Alarm circuit 634 generates a remote alarm signal 638 and/or lights LED 640 in response to a blown fuse in socket 602.

When a fuse is used in the second socket 604, once the fuse has blown, current is established between the bus and alarm circuit 636. Current flows through alarm connection 622, through conductive path 648, and through interface 650. Alarm circuit 636 generates a remote alarm signal 642 and/or lights LED 644 in response to a blown fuse in socket 604.

When a circuit breaker is used in the first socket 602, once the circuit breaker trips, current is established between the voltage source 666 and the alarm circuit 634. Voltage source 666 can provide a positive or negative voltage. Current flows through interface 668, through conductive path 628, through alarm connections 614 and 618, through conductive path 626, and through interface 630. Alarm circuit 634 generates the remote alarm signal 638 and/or lights LED 640 in response to a tripped circuit breaker in socket 602.

When a circuit breaker is used in the second socket 604, once the circuit breaker trips, current is established between the voltage source 666 and the alarm circuit 636. Current flows through interface 668, through conductive path 629, through alarm connections 624 and 620, through conductive path 627, and through interface 632. Alarm circuit 636 generates the remote alarm signal 642 and/or lights LED 644 in response to a tripped circuit breaker in socket 604.

Figure 7:
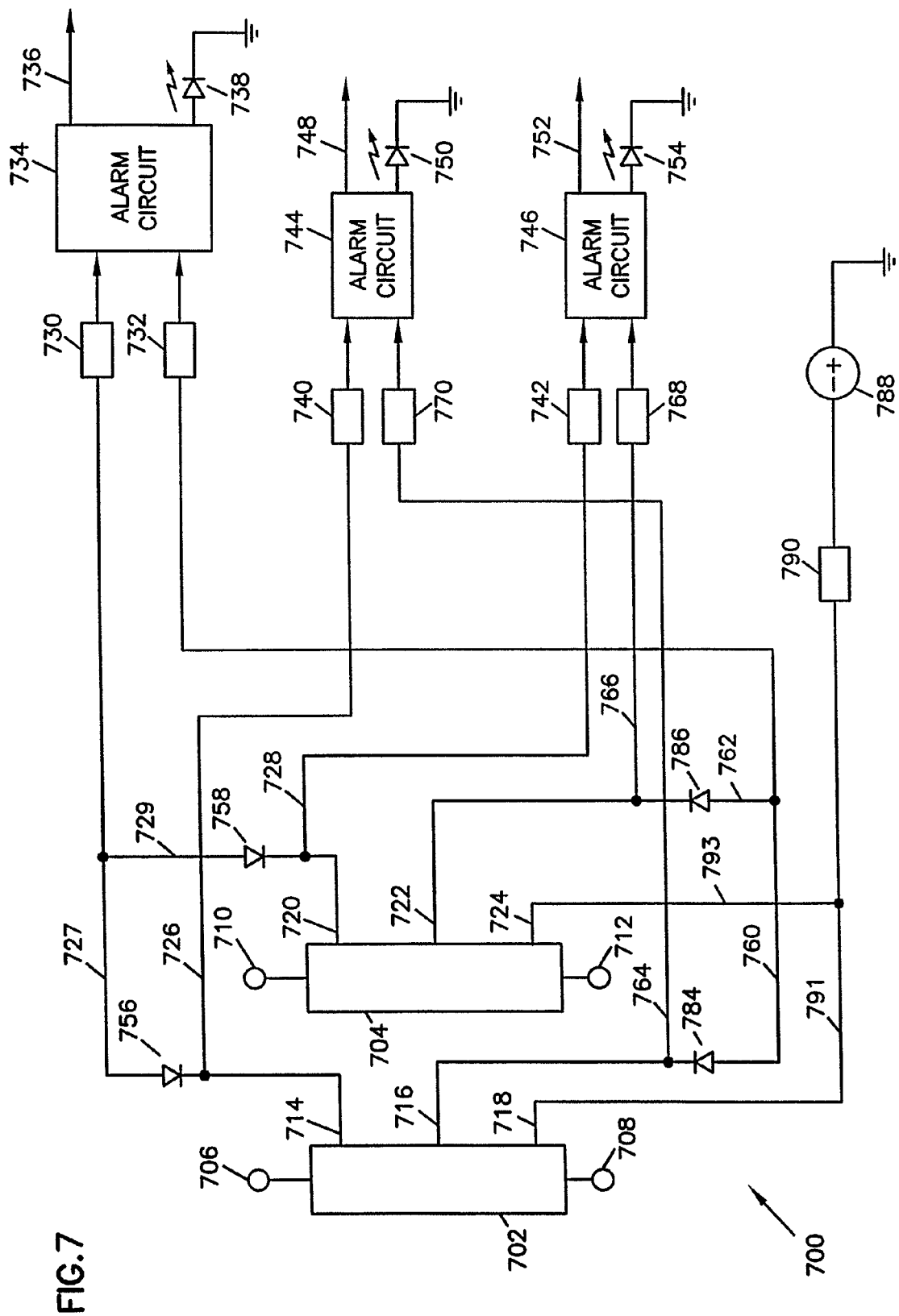
FIG. 7 is a schematic of a protection and alarming configuration employing selectable alarming with mixed fuses and circuit breakers.

FIG. 7 shows a protection and alarm configuration 700 for a power distribution bus (not shown). This configuration permits fuses and circuit breakers to be mixed for protection while permitting selection of discrete alarming for each distribution line or a single alarm responsive to several of the distribution lines. At any given time, one socket may have a fuse and the other may have a circuit breaker, both may have fuses, or both may have circuit breakers. As previously discussed, two individual distribution lines are shown to simplify understanding of the protection and alarm configurations and any number of distribution lines may be applicable.

The configuration 700 includes a socket 702 and a socket 704. Current from the power distribution bus (not shown) is provided through a fuse or circuit breaker in socket 702 from the bus terminal 706 to the terminal 708 that leads to a downstream device. Current from the power distribution bus is also provided through a fuse or circuit breaker in socket 704 from the bus terminal 710 to the terminal 712.

When discrete alarms are used for each line and a fuse is placed in socket 702, once the fuse blows, current is established between the bus and alarm circuit 744. Current flows through alarm connection 716, through conductive path 764, and through interface 770. The alarm circuit 744 generates a remote alarm signal 748 and/or lights LED 750 in response to a blown fuse in socket 702.

When discrete alarms are used for each line and a fuse is placed in socket 704, once the fuse blows, current is established between the bus and alarm circuit 746. Current flows through the alarm connection 722, through conductive path 766, and through interface 768. Alarm circuit 746 generates a remote alarm signal 752 and/or lights LED 754 in response to a blown fuse in socket 704.

When discrete alarms for each line are used and a circuit breaker is placed in socket 702, once the circuit breaker trips, current is established between voltage source 788 and alarm circuit 744. Current flows through interface 790, through conductive path 791, through alarm connections 718 and 714, through conductive path 726, and through interface 740. Alarm circuit 744 generates the remote alarm signal 748 and/or lights LED 750 in response to a tripped circuit breaker in socket 702.

When discrete alarms for each line are used and a circuit breaker is placed in socket 704, once the circuit breaker trips, current is established between the voltage source 788 and alarm circuit 746. Current flows through interface 790, through conductive path 793, through alarm connections 724 and 720, through conductive path 728, and through interface 742. Alarm circuit 746 generates the remote alarm signal 752 and/or lights LED 754 in response to a tripped circuit breaker in socket 704.

When a single alarm is used for several lines and a fuse is placed in socket 702, once the fuse blows, current is established between the bus and the alarm circuit 734. Current flows through alarm connection 716, through conductive path 760, and through interface 732. A diode 784 is placed in conductive path 760 to prevent current from flowing through conductive path 762 to conductive path 726 and alarm circuit 744 when discrete alarming is used and when a non-tripped circuit breaker is in socket 702 and a blown fuse is in socket 704. Alarm circuit 734 generates a remote alarm signal 736 and/or lights LED 738 in response to a blown fuse in socket 702.

When a single alarm is used for several lines and a fuse is placed in socket 704, once the fuse blows, current is established between the bus and the alarm circuit 734. Current flows through alarm connection 722, through conductive path 762, and through interface 732. A diode 786 is placed in conductive path 762 to prevent current from flowing through conductive path 760 to conductive path 762 and alarm circuit 746 when discrete alarming is used and when a non-tripped circuit breaker is in socket 704 and a blown fuse in socket 702. Alarm circuit 734 generates the remote alarm signal 736 and/or lights LED 738 in response to a blown fuse in socket 704.

When a single alarm is used for several lines and a circuit breaker is placed in socket 702, once the circuit breaker trips, current is established between voltage source 788 and alarm circuit 734. Current flows through interface 790, through conductive path 791, through alarm connections 718 and 714, through conductive path 727, and through interface 730. A diode 756 is placed in conductive path 727 to prevent current from flowing between the voltage source 788 and the alarm circuit 744 when discrete alarming is used with a tripped circuit breaker in socket 704 and a non-tripped circuit breaker in socket 702. Alarm circuit 734 generates the remote alarm signal 736 and/or lights LED 738 in response to a tripped circuit breaker in socket 702.

When a single alarm is used for several line and a circuit breaker is placed in socket 704, once the circuit breaker trips, current is established between voltage source 788 and alarm circuit 734. Current flows through interface 790, through conductive path 793, through alarm connections 724 and 720, through conductive path 729, and through interface 730. A diode 758 is placed in conductive path 729 to prevent current from flowing between the voltage source 788 and the alarm circuit 746 when discrete alarming is used with a tripped circuit breaker in socket 702 and a non-tripped circuit breaker in socket 704. Alarm circuit 734 generates the remote alarm signal 736 and/or lights LED 738 in response to a tripped circuit breaker in socket 704.

While the invention has been particularly shown and described with reference to preferred embodiments thereof, it will be understood by those skilled in the art that various other changes in the form and details may be made therein without departing from the spirit and scope of the invention.

What is claimed is:

1. A power distribution bus alarm circuit comprising:
   a first and a second socket, each having three alarm connections and two power connections plugged into the bus;
   an alarm circuit connected to first and second alarm connections of the first and second sockets, the alarm circuit being responsive to a voltage being applied from the first of the three connections of the first or second socket and being responsive to a voltage being applied across second and third connections of the first or second sockets;
   a second alarm circuit connected to first and second alarm connections of the first socket, the alarm circuit being responsive to a voltage being applied from the first of the three connections of the first socket and being responsive to a voltage being applied across second and third connections of the first socket; and
   a third alarm circuit connected to first and second alarm connections of the second socket, the alarm circuit being responsive to a voltage being applied from the first of the three connections of the second socket and being responsive to a voltage being applied across second and third connections of the second socket.

2. The power distribution bus alarm circuit of claim 1, further comprising a voltage source electrically connected to third alarm connections of the first and second sockets.

3. The power distribution bus alarm circuit of claim 1, further comprising a fuse electrically interconnecting the two power connections of the first socket and isolating the first alarm connection of the first socket from the power connections when in a non-blown state.

4. The power distribution bus alarm circuit of claim 3, wherein the fuse connects the first alarm connection of the first socket to at least one of the two power connections of the first socket when in a blown state.

5. The power distribution bus alarm circuit of claim 4, further comprising a circuit breaker positioned in the second socket, the circuit breaker electrically interconnecting the two power connections of the second socket when in a non-tripped state and electrically interconnecting the second and third alarm connections of the second socket when in a tripped state.

6. The power distribution bus alarm circuit of claim 1, further comprising a circuit breaker positioned in the first socket, the circuit breaker electrically interconnecting the two power connections of the first socket when in a non-tripped state and electrically interconnecting the second and third alarm connections of the first socket when in a tripped state.

7. The power distribution bus alarm circuit of claim 1, further comprising a remote alarm signal connected to the alarm circuit.

8. The power distribution bus alarm circuit of claim 1, further comprising a remote alarm signal connected to the second alarm circuit and a remote alarm signal connected to the third alarm circuit.

9. The power distribution bus alarm circuit of claim 1, further comprising a diode connected between the first alarm connection of the first socket and the alarm circuit.

10. The power distribution bus alarm circuit of claim 1, further comprising a diode connected between the first alarm connection of the second socket and the alarm circuit.

11. The power distribution bus alarm circuit of claim 1, further comprising:
    a light emitting diode connected to the alarm circuit;
    a second light emitting diode connected to the second alarm circuit; and
    a third light emitting diode connected to the third alarm circuit.

12. A method of employing fuses and circuit breakers with a power distribution bus, the method comprising:
    inserting a fuse with an alarm connector in a first socket, the first socket connected to and receiving power from a power distribution bus;
    inserting a circuit breaker with a pair of alarm connectors in a second socket, the second socket connected to and receiving power from the power distribution bus;
    inhibiting a response from a common alarm circuit until either the fuse is blown or the circuit breaker is tripped;
    inhibiting a response from a second alarm circuit electrically linked to the first socket until the fuse is blown;
    inhibiting a response from a third alarm circuit electrically linked to the second socket until the circuit breaker is tripped.

13. The method of claim 12, further comprising:
    removing the fuse from the first socket;
    inserting a second circuit breaker with a pair of alarm connectors in the first socket; and
    inhibiting a response from the second alarm circuit electrically linked to the first socket until the second circuit breaker is tripped.

14. The method of claim 12, further comprising:
    removing the circuit breaker from the second socket;
    inserting a fuse with an alarm connector in the second socket; and
    inhibiting a response from the third alarm circuit electrically linked to the second socket until the fuse is blown.

15. The method of claim 12, further comprising tripping the circuit breaker to deliver power to the common alarm circuit and the third alarm circuit through the pair of alarm connectors.

16. The method of claim 15, further comprising, upon tripping the circuit breaker, activating a light emitting diode electrically connected to at least one of the common alarm circuit and the second alarm circuit.

17. The method of claim 12, further comprising blowing the fuse to deliver power to the common alarm circuit and the second alarm circuit through the alarm connector.

18. The method of claim 16, further comprising, upon blowing the fuse, activating a light emitting diode electrically connected to at least one of the common alarm circuit and the second alarm circuit.

19. A power distribution bus circuit comprising:
a power distribution bus;
a first socket electrically connected between the power distribution bus and a power distribution circuit, the first socket including at least one alarm connection and configured to receive a fuse or a circuit breaker;
a second socket electrically connected between the power distribution bus and a second power distribution circuit, the second socket including at least one alarm connection and configured to receive a fuse or a circuit breaker;
a first alarm circuit electrically connected to the at least one alarm connection of both the first and second sockets, the first alarm circuit being responsive to a voltage being applied from the at least one alarm connection of either of the first and second circuits;
a second alarm circuit electrically connected to the at least one alarm connection of the first socket, the second alarm circuit being responsive to a voltage being applied from the at least one alarm connection of the first circuit; and
a third alarm circuit electrically connected to the at least one alarm connection of the second socket, the third alarm circuit being responsive to a voltage being applied from the at least one alarm connection of the second circuit.

20. The power distribution bus circuit of claim 19, wherein the at least one alarm connection of each of the first and second sockets includes a plurality of conductive paths electrically connected to that socket.

21. The power distribution bus circuit of claim 20, further comprising a voltage source electrically connected to one of the plurality of alarm connections of the first and second sockets.

* * * * *